Sept. 15, 1970     C. L. CUMMINS     3,528,317
INTERNAL COMBUSTION ENGINE
Original Filed Feb. 8, 1968     7 Sheets-Sheet 1

INVENTOR.
CLESSIE L. CUMMINS

ATTORNEYS

Sept. 15, 1970  C. L. CUMMINS  3,528,317

INTERNAL COMBUSTION ENGINE

Original Filed Feb. 8, 1968  7 Sheets-Sheet 2

INVENTOR.
CLESSIE L. CUMMINS

Owen, Wickersham & Erickson
ATTORNEYS

INVENTOR.
CLESSIE L. CUMMINS

ATTORNEYS

Sept. 15, 1970          C. L. CUMMINS          3,528,317

INTERNAL COMBUSTION ENGINE

Original Filed Feb. 8, 1968          7 Sheets-Sheet 4

INVENTOR.
CLESSIE L. CUMMINS

Owen, Wickersham & Erickson
ATTORNEYS

Sept. 15, 1970        C. L. CUMMINS        3,528,317
INTERNAL COMBUSTION ENGINE
Original Filed Feb. 8, 1968        7 Sheets-Sheet 6

INVENTOR.
CLESSIE L. CUMMINS

ATTORNEYS

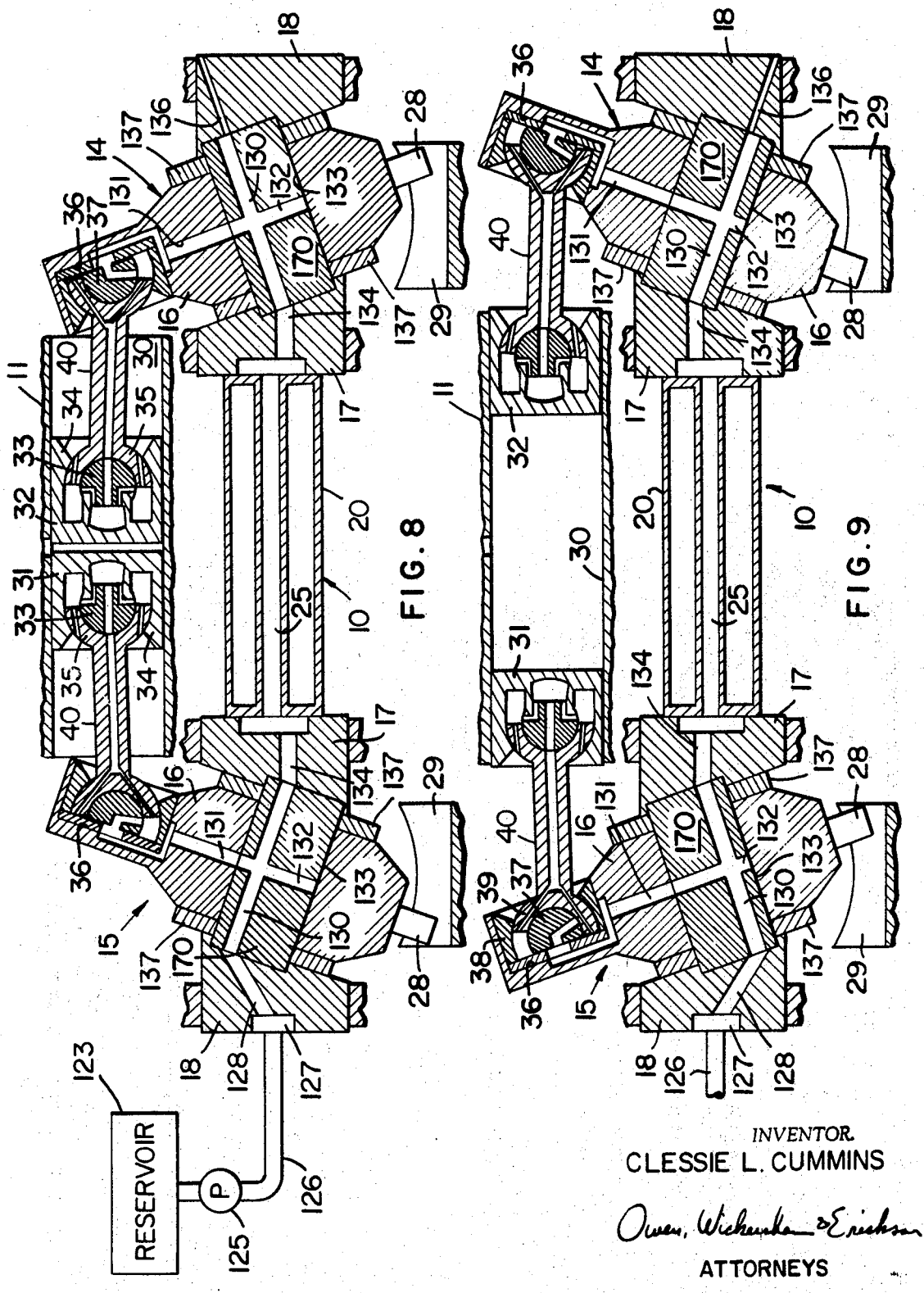

United States Patent Office 3,528,317
Patented Sept. 15, 1970

3,528,317
INTERNAL COMBUSTION ENGINE
Clessie L. Cummins, P.O. Box 785, Sausalito, Calif.
Original application Feb. 8, 1968, Ser. No. 704,115.
Divided and this application Apr. 14, 1969, Ser.
No. 829,838
Int. Cl. F16c 3/12
U.S. Cl. 74—598                            12 Claims

ABSTRACT OF THE DISCLOSURE

A Z-crankshaft is assembled from novel converter units, some crank webs, and a tubular cylindrical shaft, in a manner enabling inexpensive machining and manufacturing costs.

---

This application is a division of application Ser. No. 704,115 filed Feb. 8, 1968.

This invention relates to a Z-crankshaft for an improved internal combustion engine of the type in which two opposed pistons move symmetrically in each cylinder toward and away from each other.

Conventional engines have had to be relatively bulky and heavy, and have required large, heavy engine blocks, which have been very expensive to manufacture, and have required a great many expensive machine tools. The present invention has among its objects the provision of an engine which is small in bulk relative to its power, is light in weight relative to its life, is relatively free from vibration, enables the use of many identical parts, and has no large, heavy engine block and therefore does not require the manufacturer to maintain a heavy extensive line of machine tools. This object may be achieved partly by a novel assembled Z-crankshaft with novel converter plates.

This invention makes practical the machinery, assembly and operation of a Z-crankshaft. Instead of having to manufacture unitary crankshaft which is cylindrical throughout with converters fixed to it at an angle and instead of having an integral crankshaft machined to provide two angular portions on which to mount the converters, I provide a crankshaft which is made up of several segments. This novel crankshaft construction enables the crank webs to be made from castings or forgings by relatively simple machinery, and for these crank webs to provide the crankshaft journals in the main engine bearings. The whole is outstandingly practical and convenient and is relatively inexpensive to manufacture. The Z-shaped crankshaft is also novel in structure as are its thrust-to-torque converter units and its lubrication system.

Other objects and advantages of the invention will become apparent from the following description of a preferred form of the invention.

In the drawings:

FIGS. 8 and 9 are two simplified views in side elevation and partly in section of the lubrication system for the thrust converter system, the figures differing in showing two extreme positions.

The drawings show an engine in a simplified depiction, without placing stress on relatively obvious refinements of portions thereof, such as counterweighting. By way of example, a three-cylinder, six-piston engine is herein described, and it will be understood that basically the same factors with the obvious differences would apply to a five-cylinder, ten-piston engine, or to a seven-cylinder, fourteen-piston engine.

Figure 1:
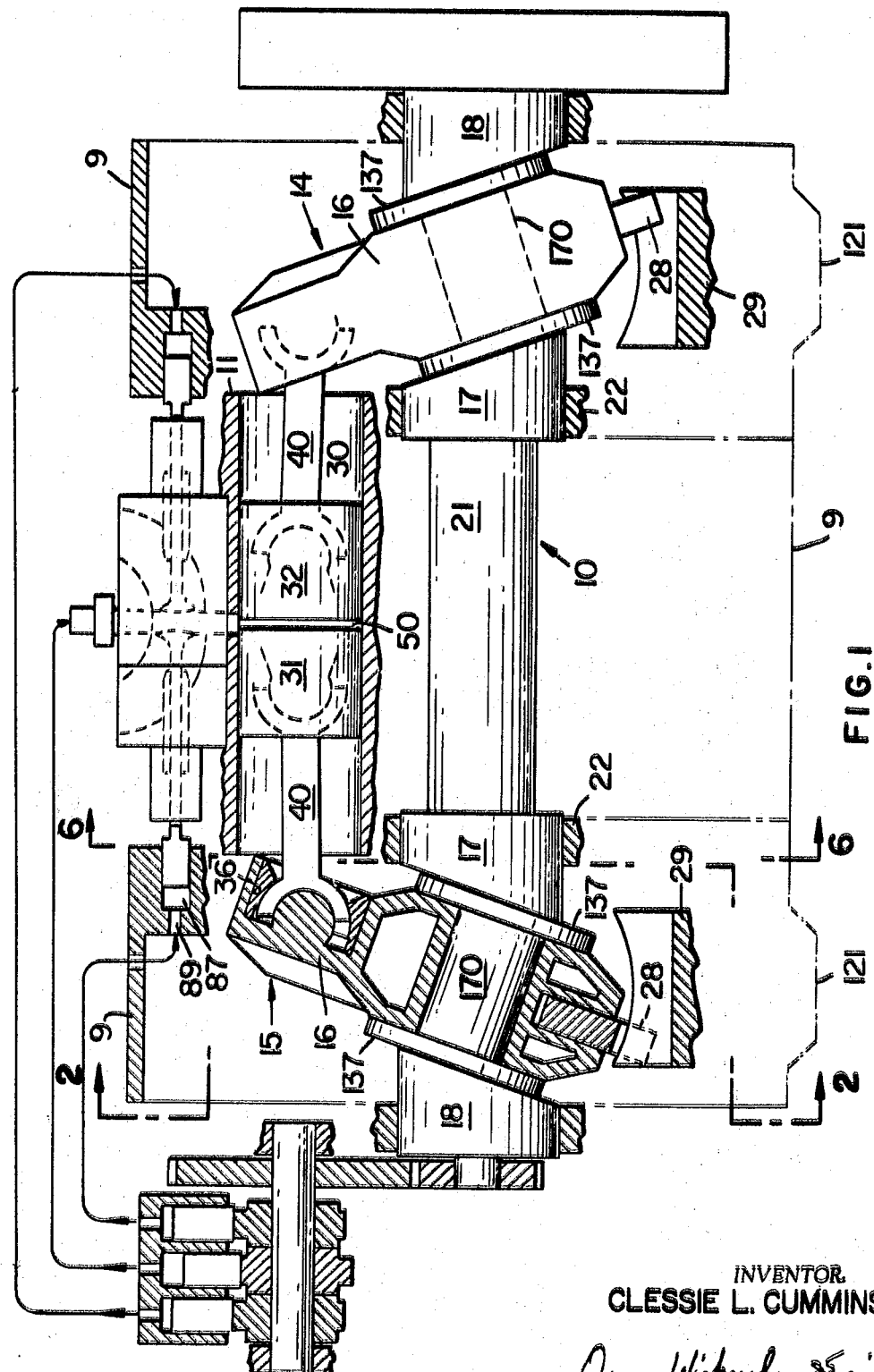
FIG. 1 is a simplified view in side elevation and partly in section of a three-cylinder engine embodying the principles of the invention, showing one cylinder thereof. It can be considered as taken along the line 1—1 in FIG. 2, with some parts broken or omitted.
Figure 4:
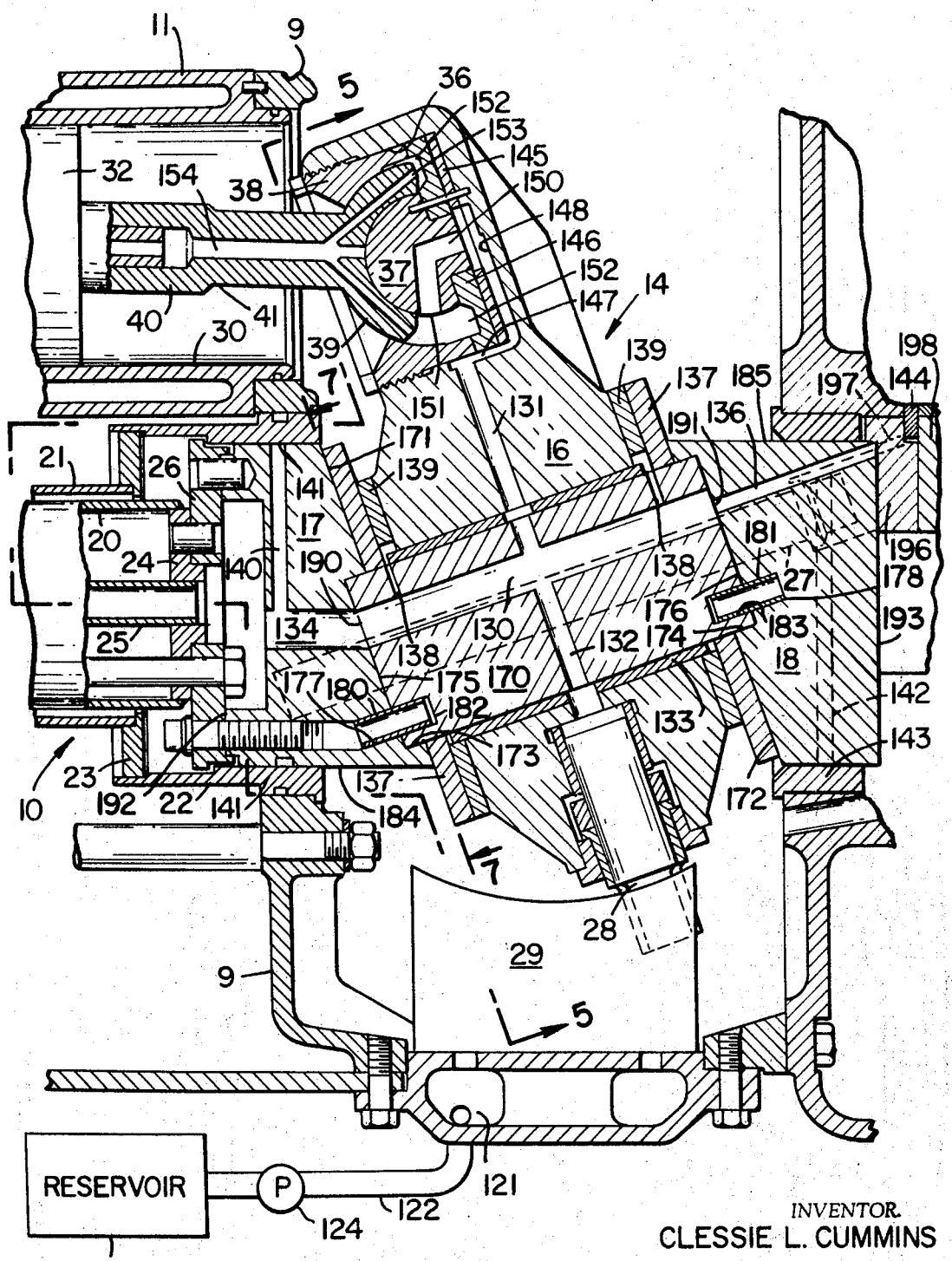
FIG. 4 is a fragmentary view in elevation and in section of one of the thrust converter units and adjacent parts.
Figure 5:
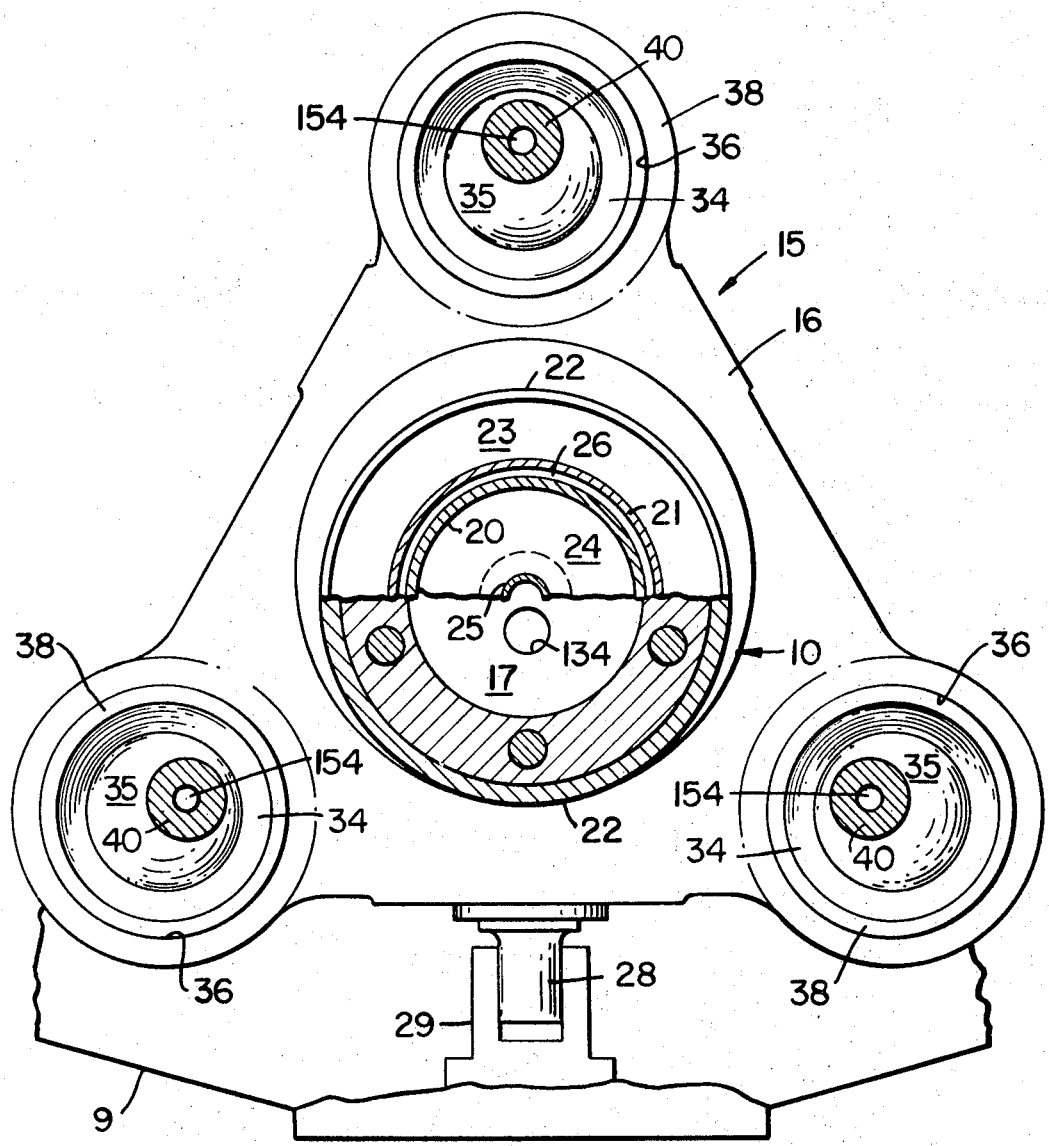
FIG. 5 is a view in section taken along the line 5—5 in FIG. 4.
Figure 6:
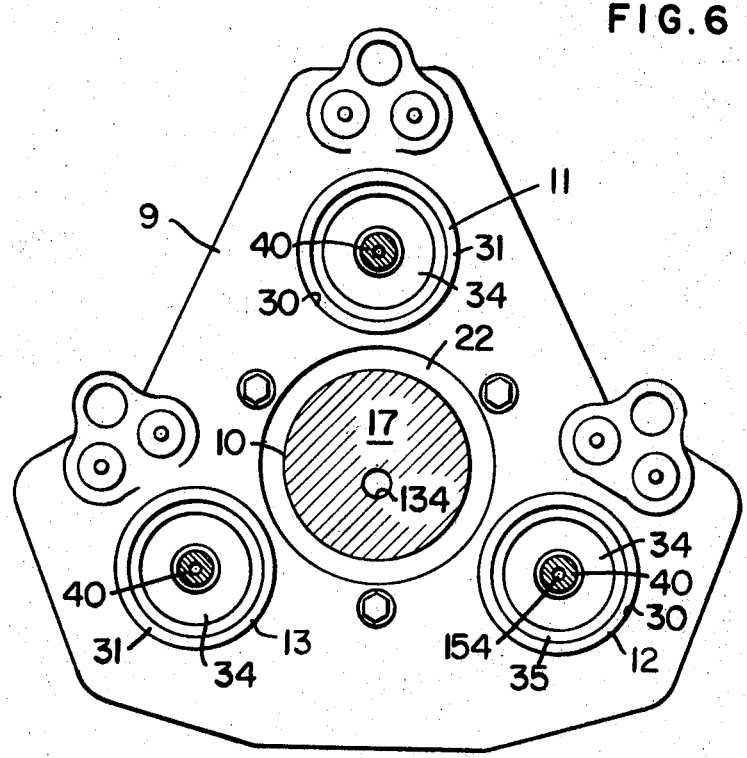
FIG. 6 is a simplified view in section of a three-cylinder engine, taken along the line 6—6 in FIG. 1, and omitting some parts.
Figure 7:
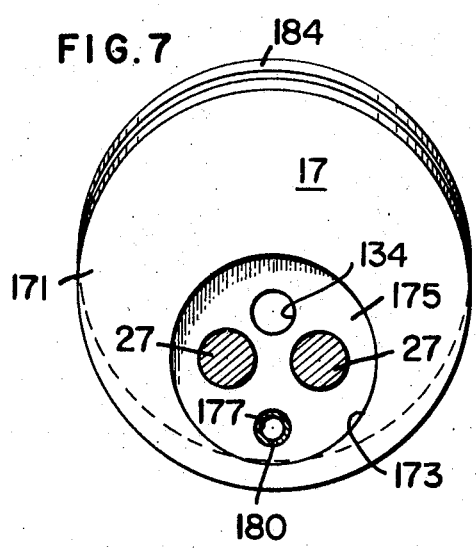
FIG. 7 is an end view of one crank web. It may be considered as taken along the line 7—7 in FIG. 4, but showing only the crank web.

An engine housing 9 (FIG. 1) surrounds a central crankshaft 10 and three cylinder bodies 11, 12, and 13. The crankshaft 10 carries and is driven by a pair of thrust converters 14 and 15, each of which may, for example, comprise a generally flat, generally triangular member 16 (FIG. 5). In the crankshaft 10, each of a pair of crank pins 170 (see FIG. 1) is placed at an angle between a pair of inner and outer crank webs 17 and 18, giving the appearance of a Z at each location, so that the crankshaft 10 is herein called a Z-crankhaft. The two inner webs 17 are joined to each other by a central tubular hollow cylindrical crankshaft portion 20 that rotates inside a simple tubular housing member 21 (see FIGS. 4 and 5). Each of the thrust converters 14, 15 is mounted on a crank pin 170 (FIG. 1). Other structures may be used, but there are advantages in the structure shown. Each inner crank web 17 (see FIG. 4) may rotate inside a simple tubular housing member 22 that may be readily assembled to the member 21, as by means of a flange 23 on each end of the member 21. The tubular crankshaft portion 20 preferably has an end plate 24 at each end welded to the tube 20, and a central lubrication conduit 25 may extend between and preferably be welded to the end plates 24. The crankshaft portion 20 may be anchored at each end to its inner crank webs 17, as by a perforate ring 26 which may be doweled and bolted to both the end plate 24 and the crank web 17. The crank webs 17 and 18 may be both doweled to their crank pins 170, and the three elements may also be held together by a bolt 27. Each converter unit 16 may be provided with a projecting rod 28 which reciprocates in a channel provided by a stationary guide member 29, which is anchored to the main engine case 9.

Figure 2:
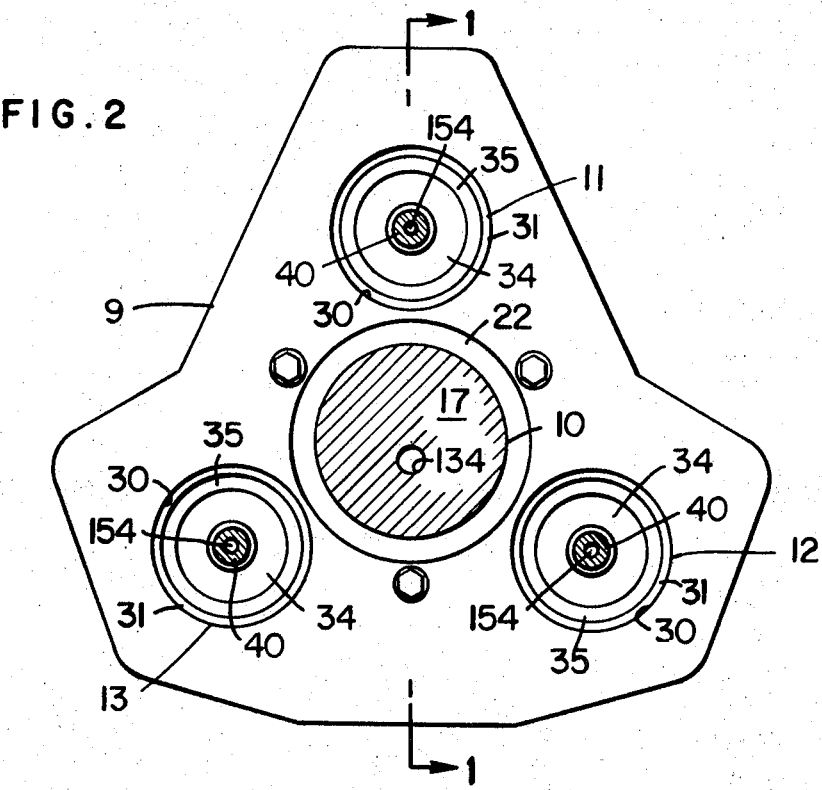
FIG. 2 is a view in section taken along the line 2—2 in FIG. 1.

Each cylinder body 11, 12, or 13 (see FIGS. 1–3) preferably provides one cylinder 30 and has two pistons 31 and 32. A more conventional type of engine block can be used, if desired, or the cylinders may be made in more than one piece. There are advantages in the single separate bodies shown. Each piston is preferably provided with removable ball member 33 (FIG. 3) and a removable spherical-surfaced socket member 34 to receive a ball-socket member 35, and each converter unit 16 preferably has one recess 36 (FIG. 4) for each cylinder casting, in which is provided a ball member 37 and a spherical-surfaced socket member 38 that receive between them a ball-socket member 39. The two ball-socket members 35 and 39 are joined together to provide a connecting rod 40 having a stem portion 41 between their ball-socket portions. Thus, the pistons 31 and 32 are made to reciprocate with the thrust converters 14 and 15, the power from the fuel thereby being sent to the Z-crankshaft 10 and being converted from thrust into torque.

The pistons 31 and 32 are so connected to the thrust converters 14 and 15 that they move symmetrically toward each other for compressing the gaseous charge, and then after firing are moved away from each other symmetrically. The cylinder bodies 11, 12, 13 are all identical to each other, and so are the pistons 31, 32, and so are the combustion chambers and valves. The cylinder 30 is open at both ends for free operation of the connecting rods 40.

The lubrication system of the invention is important. Lubrication is always a very important factor in engine life and efficiency, but few engines have been really properly designed for maximum efficiency, which includes both oiling and cooling. Cooling is probably the more important, as important bearings, such as those for the connecting rod and piston pins, run hot, and a surplus of cool oil is the only way to carry off this heat. Another problem in industrial engines and in earthmoving engines is due to extreme angles met in hillside operations in all off-highways operation. Engines have been required to run with oil piled up above bearings at one end with the crank pin bearings beating oil to foam and leaking out through seals.

In my new engine, crank pin bearings are at each end of the engine and have a deep oil sump under them. By using a so-called dry sump, a scavenging pump moves the used oil (after it flows to the sump) from the sump up to an oil tank, preferably high above the sump, and the oil is then cooled. Another pump supplies, under higher pressure, filtered and cooled oil back to all bearings. The lubrication is done preferably in a dry-sump system having a pair of sumps 121 (FIGS. 1 and 4), one at each end of the engine housing 9, from which conduits 122 carry the oil to a reservoir 123 under the influence of one or more pumps 124. By having a sump 121 at each end of the housing 9, the sumps 121 are kept dry even when the engine is tilted sharply.

From the reservoir 123, where suitable cooling, de-aeration, and filtering are provided, the oil may be forced by a pump 125 through suitable conduits 126 (FIGS. 8 and 9) to the outer crank web 18 of the torque converter 15 and is there applied to an inlet 127. A separate conduit may be used to supply oil to the torque converter 14 from the same reservoir in a symmetrical system, or the system shown in the drawing may be used. There, the inlet 127 sends the oil via a conduit 128 to a conduit 130 through the crank pin 170. In the center of the crank pin 170 (see FIGS. 8 and 4), there is a series of branch conduits 131 and 132, three conduits 131 leading to the three recesses 36 and the conduit 132 leading to a crank pin bearing 133. The conduit 130 continues through the crank pin 170 to a conduit 134 leading through the adjacent crank web 17. From there oil passes through the central conduit 25 into a conduit 134 through the other crank web 17 on the other side of the tube 20. The conduit 134 leads to another central conduit 130 through the crank pin 170 of the converter 14 and through a conduit 136 in the other crank web 18 to a rotating thrust plate 196 and through a conduit 197 to lubricate a fixed thrust bearing 144, which is located between the thrust plate 196 and a revolving thrust plate 198. Thrust plates 137 on each side of the members 16 are lubricated by grooves not shown here by oil from conduits 138 that come off from the conduit 130 (FIG. 4). The conduit 130 also helps to lubricate all the bearings 133 and thrust plates 139. A conduit 140 in each web 17 lubricates main bearings 141. Conduits 142 in the webs 18 lubricate main bearings 143.

Figure 3:
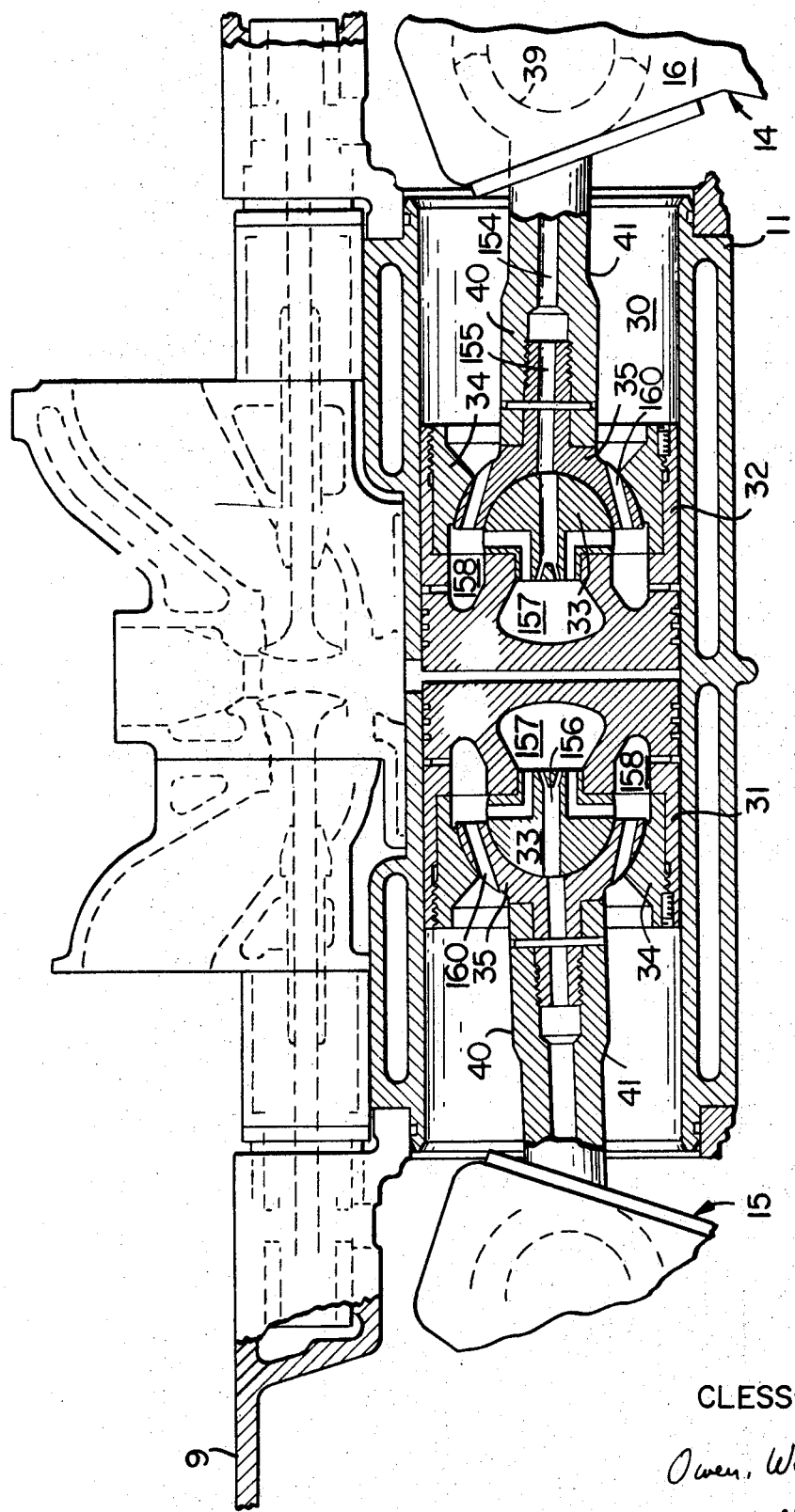
FIG. 3 is an enlarged view in elevation and partly in section of one cylinder and its associated valve assemblies.

In the two members 16, the branches 132 lead down to lubricate the lower portions, including the bearings 133 and the guide members 28 and 29, and oil drains down to the sump 121. The conduits 131 lead into the recesses 36 where the members 37, 38 and base members 145 and 146 provide a conduit 147 leading to the end 148 of the recess 36. From there the ball 37 is provided with an angled conduit 150, the outer end or port 151 of which is alternately covered and uncovered by the ball-socket member 39. When it is covered, the oil passes no further; but when it is uncovered, oil flows into a recess 152 surrounding the ball 37 and from there into a conduit 153 of the ball-socket member 39 leading into a conduit 154 in the center of the stem portion 41. From there, the conduit 154 flows, as shown in FIG. 3, into a conduit 155 of the member 35, which leads to a conduit 156 through the ball 33 and into a chamber 157 at the end of the piston 31 or 32. From there, oil flows by a side chamber 158 into conduits 160 through the member 35, and thence back out of the cylinder 30. Thereby the cylinder 30 and pistons 31 and 32 are lubricated, and the excess oil falls down into the engine sumps 121. As shown, the connecting rods 40 between the pistons 31, 32 and the thrust converters 14 and 15 act to control the lubrication.

The stop-off of the conduit 150, 151 (FIG. 4) by the ball-socket member 39 is quite important, for these parts function as check valves that send oil through the conduit 154 as the connecting rods 40 are *out*, as in FIG. 9, and open to receive another charge of oil when the connecting rods 40 are *in*, as in FIGS. 4 and 8. Without this check-valve action, the oil would tend to move back and forth in the conduit 154, for the oil would not get unidirectional movement, and this could actually starve the parts 33, 34, 35 in the midst of plenty. The check-valve action assures the needed single direction of movement of the oil and thereby feeds the needed oil to the parts 33, 34, and 35.

FIG. 4 shows how this invention also makes practical the machining, assembly, and operation of the crankshaft 10. Instead of trying to have a unitary crankshaft which is cylindrical throughout with converters fixed to it at an angle, a thing which is difficult to manufacture, and instead of having an integral crankshaft machined to provide two angular portions on which to mount the converters, I provide a crankshaft 10 which is made up of several segments.

As has been seen, the two opposite crank webs 17 are connected together by the center tubular member 20, and between each of the two outer crank webs 18 and their respective inner webs 17 is a simple cylindrical crank pin 170. The crank webs 17 and 18 are machined to give the needed angle at faces 171 and 172, and each is preferably provided with a recess 173 or 174 the same diameter as the crank pin 170, each recess 173, 174 having an end wall 175 or 176 which lies at the exact angle required; this machining is, of course, easily done on a conventional lathe. The cylindrical crank pin 170 has its passages 130, 131, 132, and 138 drilled as shown; when it is joined to the two crank webs 17 and 18, it fills the recesses 173 and 174, and its ends 190 and 191 bear on the recessed walls 175 and 176. Before such joining, dowel openings 177 and 178 are provided in the respective crank webs 17 and 18, and receive dowels 180 and 181. Dowel openings 182 and 183 in the cylindrical crank pin 170 receive the other ends of the dowels 180 and 181, which thus serve to align the cylindrical crank pin 170 with the webs 17 and 18, and this proper alignment is retained when the assembly is tightened by the bolts 27.

This novel crankshaft construction enables the crank webs 17 and 18 to be made from castings or forgings by relatively simple machining, which includes machined cylindrical external walls 184 and 185 which provide journals for the main bearings 141 and 143. Both ends 190 and 191 of the crank pin 170, the inner end 192 of each crank web 17, and the outer end 193 of each crank web 18 are perpendicular to their respective cylindrical axes. The crank pin 170 is coaxial with its member 16, with a bearing 133 therebetween; so that the assembled thrust converters 14 and 15 are easily put together and on the crank pin 170 before assembling the crank pins 170 with the crank webs 17 and 18 to complete the crankshaft 10. When assembly is complete, the crank webs 17 and 18 provide the crankshaft journals in these four main engine bearings 141 and 143. The whole is an outstandingly practical and convenient system and is relatively inexpensive to manufacture.

Figure 10:
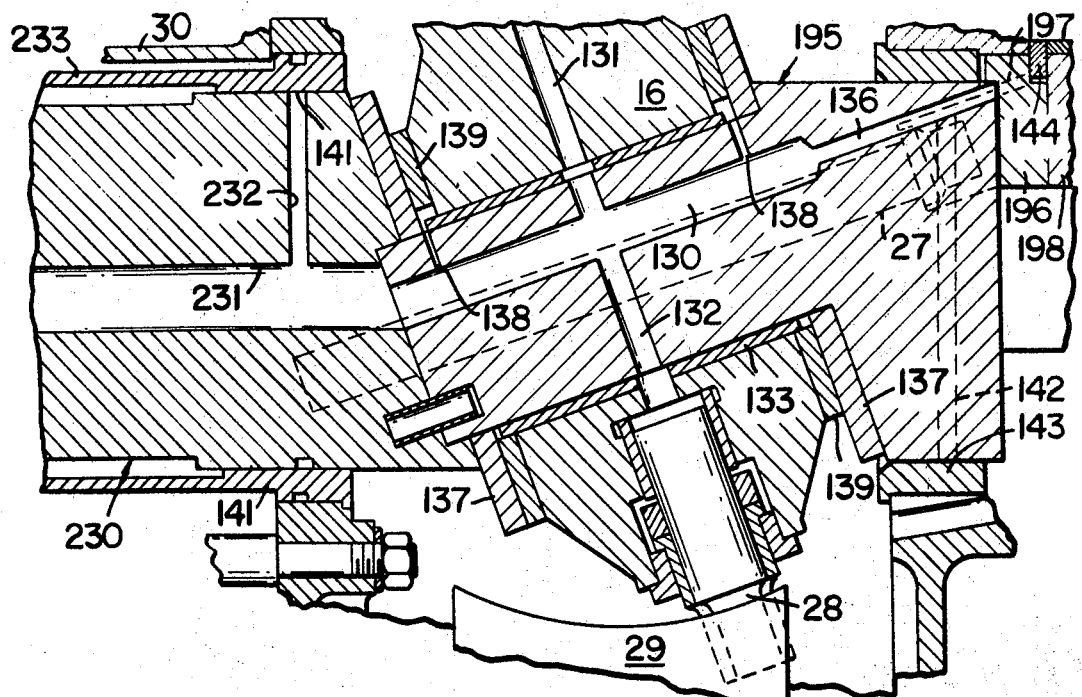
FIG. 10 is a view of a portion of FIG. 4 showing a modified form of crankshaft structure of this invention.

FIG. 10 shows a modified form of crankshaft structure which may often be preferable. Here, instead of the outer crank web 18 and the crank pin 170 being separate (as in FIG. 4), they are replaced by a unitary web-pin member 195 that is machined to give the desired surfaces and bores. It is still separate from the inner crank web 17, which may remain a separate member, or the two crank webs 17 and the tube 20 may be made integral, as shown, where a large tube 230 having a central opening 231 for oil, replaces the two webs 17 and the tube 20 and the members connecting them. The tube 230 may be machined down in between the main bearings 141, if desired. A passage 232 lubricates the bearings 141, which may be integral with an outer cylindrical tubular housing 233, or may be assembled to such a housing. Similarly, other structures are suggested, such as having the outer crank web 18 as a separate member but combining into one piece the inner crank web and crank pin. The structure of FIG. 10 is preferable to this generally, and it is also generally better than splitting the thrust converters 14 and 15 and making both webs 17 and 18 integral with the crank pin 20.

To those skilled in the art to which this invention relates, many changes in construction and widely differing embodiments and applications of the invention will suggest themselves without departing from the spirit and scope of the invention. For example, the combustion chamber structure with its opposed valves and separate walls for the intake valves, the exhaust valves, and the injector or igniter, may be used with conventional cylinders with advantage. As another example, the gasket 46 may be comprised of more than one gasket member. The disclosures and the description herein are purely illustrative and are not intended to be in any sense limiting.

I claim:
1. A crankshaft combination for support by engine main bearings comprising
 a central tubular portion with a Z-shaped portion on each side thereof made up of
 an inner crank web bearing portion on each side of said tubular portion for support by an engine main bearing having its outer periphery cylindrical and coaxial with said tubular portion,
 an outer crank web bearing portion for support by another engine main bearing having its outer periphery cylindrical and coaxial with said tubular portion and spaced from and adjacent said inner crank web portion,
 a cylindrical crank pin portion between each outer and inner crank web portions and joining them and having its axis inclined to theirs, and
 a pair of thrust converter members, each said converter member being rotatably bearinged on said crank pin between a said outer crank web portion and a said inner crank web portion.

2. The crankshaft combination of claim 1 wherein each said crank pin portion and one said outer crank web portion are part of the same integral piece and said two inner crank web portions and said tubular portion are a separate integral piece secured between the two crank pin portions after said thrust converter members, each of which is another separate piece, are in place on said crank pin portions.

3. A crankshaft combination comprising
 a central tubular portion with a Z-shaped portion on each side thereof made up of
 an inner crank web portion on each side of said tubular portion having an outer cylindrical periphery coaxial with said tubular portion,
 an outer crank web portion having an outer cylindrical periphery coaxial with said tubular portion and spaced from and adjacent said inner crank web portion,
 a cylindrical crank pin portion between each outer and inner crank web portions and joining them and having its axis inclined to theirs,
 said crank pin portion being one separate piece and each of said crank web portions being separate pieces, and
 a pair of thrust converter members, each said converter member being positioned on said crank pin between a said outer crank web portion and a said inner crank web portion.

4. A Z-shaped crankshaft segment including in combination
 a central cylindrical crank pin with end walls perpendicular to the axis of the cylinder,
 a pair of cylindrical crank webs, one on each side of said crank pin, each having one end wall perpendicular to the axis of its own said cylinder and a second end wall inclined to that said axis, said second end wall having a recess therein for receiving an end wall of said crank pin against a wall in said recess, parallel to said second end wall, said second end walls of said crank webs being complementary so that the assembled crankshaft segment has the two said first end walls parallel to each other, said crank webs providing by their cylindrical outer surfaces the journals for the crankshaft segment in its bearings, and
 a torque converter member supported on said crank pin.

5. The crankshaft segment of claim 4 wherein said crank pin is aligned with each said crank web by dowel means parallel to the axis of the crank pin and is secured thereto by bolt means extending from one said crank web through said crank pin to the other said crank web.

6. A Z-shaped crankshaft segment including in combination
 a first member having a cylindrical crank pin portion with one end wall perpendicular to the axis of its cylinder and at its other end a cylindrical crank web portion inclined to said crank pin portion and having an end wall perpendicular to the axis of its cylinder,
 a second member comprising a cylindrical crank web having one end wall perpendicular to the axis of its own said cylinder and a second end wall inclined to that said axis, said second end wall having a recess therein for receiving said end wall of said crank pin against a wall in said recess, parallel to said second end wall, said crank web and crank web portions being complementary so that the assembled crankshaft segment has two outer end walls parallel to each other, said crank web and crank web portions providing by their cylindrical outer surfaces the journals for the crankshaft segment in its bearings, and
 a thrust converter member supported on said crank pin.

7. A Z-shaped crankshaft segment including in combination
 a first member having a cylindrical crank pin portion with one end wall perpendicular to the axis of its cylinder and at its other end a cylindrical crank web portion inclined to said crank pin portion and having an end wall perpendicular to the axis of its cylinder,
 a second member comprising a cylindrical crank web having one end wall perpendicular to the axis of its own said cylinder and a second end wall inclined to that said axis, said second end wall having a recess therein for receiving said end wall of said crank pin against a wall in said recess, parallel to said second end wall, said crank web and crank web portions being complementary so that the assembled crankshaft segment has two outer end walls parallel to each other, said crank web and crank web portions providing by their cylindrical outer surfaces the journals for the crankshaft segment in its bearings, and
 a thrust converter member supported on said crank pin, said first member being aligned with said second member by dowel means parallel to the axis of the crank pin and secured thereto by bolt means extending from said crank web portion through said crank pin to the said crank web.

8. A crankshaft including in combination
first and second members, each in one piece and having a cylindrical crank pin portion and an outer cylindrical crank web and journal portion inclined to said crank pin portion,
a third member comprising two inner cylindrical crank web and journal portions joined by a coaxial cylindrical member,
aligning means for joining said third member to each said first and second members at said crank pin portion so that all said crank web portions are coaxial, said inner and outer crank web portions being complementary, said crank web portions providing by their cylindrical outer surfaces the journals for the crankshaft segment in its bearings, and
a thrust converter member supported on each said crank pin.

9. A crankshaft combination comprising
two pairs of engine bearings, and
a crankshaft supported by said bearings and having a central cylindrical tubular portion,
a cylindrical inner crank web portion on each end of said tubular portion and coaxial therewith and constituting the journals of the crankshaft running in one said pair of engine bearings,
a cylindrical outer crank web portion facing each said inner crank web portion and coaxial therewith and spaced apart therefrom and constituting the journals of the crankshaft running in the other said pair of engine bearings,
a cylindrical crank pin portion between each inner crank web portion and its facing outer crank web portion with its axis inclined relative to said central tubular portion and to said engine bearings,
means aligning each said crank pin portion with each of its said crank web portions,
means securing each said crank pin portion to both of its said crank web portions, and
a pair of thrust converter members, each said converter member having a cylindrical opening encircling a crank pin, said member thereby being positioned between a said outer crank web portion and a said inner crank web portion, said converter member extending generally normal to said crank pin.

10. The crankshaft combination of claim 9 wherein each said outer crank web portion is integral with one said crank pin portion.

11. The crankshaft combination of claim 9 wherein said tubular portions and both said inner crank web portions constitute a single integral member.

12. A crankshaft combination comprising
two pairs of engine bearings, and
a crankshaft supported by said bearings and having a central cylindrical tubular portion,
a cylindrical inner crank web portion on each end of said tubular portion and coaxial therewith and constituting the journals of the crankshaft running in one said pair of engine bearings,
a cylindrical outer crank web portion facing each said inner crank web portion and coaxial therewith and spaced apart therefrom and constituting the journals of the crankshaft running in the other said pair of engine bearings,
a cylindrical crank pin portion between each inner crank web portion and its facing outer crank web portion with its axis inclined relative to said central tubular portion and to said engine bearings,
means aligning each said crank pin portion with each of its said crank web portions,
means securing each said crank pin portion to both of its said crank web portions,
each said crank pin portion being a separate member and each said crank web portion being a separate member, said inner inclined end of said outer crank portion having a recess therein with a face parallel to said inclined end, said crank pin being seated in that said recess, and
a pair of thrust converter members, each said converter member having a cylindrical opening encircling a crank pin, said member thereby being positioned between a said outer crank web portion and a said inner crank web portion, said converter member extending generally normal to said crank pin.

References Cited

UNITED STATES PATENTS

| 1,316,679 | 9/1919 | Brackett. | |
| 1,814,946 | 7/1931 | McGeorge | 74—60 |
| 2,278,696 | 4/1942 | George | 74—60 XR |
| 3,196,698 | 7/1965 | Liddington | 74—60 |
| 3,276,276 | 10/1966 | Dangauthier | 74—60 |

FOREIGN PATENTS

| 411,101 | 6/1945 | Italy. |
| 554,199 | 2/1923 | France. |
| 740,446 | 11/1955 | England. |

FRED C. MATTERN, Jr., Primary Examiner

F. D. SHOEMAKER, Assistant Examiner

U.S. Cl. X.R.

74—60; 92—70; 123—58

PO-1050
(5/69)

UNITED STATES PATENT OFFICE
CERTIFICATE OF CORRECTION

Patent No. 3,528,317      Dated September 15, 1970

Inventor(x)      Clessie L. Cummins

It is certified that error appears in the above-identified patent and that said Letters Patent are hereby corrected as shown below:

Column 6, line 36, after "web" insert -- main bearing --.

Signed and sealed this 11th day of May 1971.

(SEAL)
Attest:

EDWARD M. FLETCHER, JR.      WILLIAM E. SCHUYLER, JR.
Attesting Officer      Commissioner of Patents